Nov. 9, 1926.

O. G. JENTSCH

VALVE STRUCTURE

Filed June 5, 1925

Witness:
G. E. Roedding

INVENTOR.
Otto G. Jentsch
BY
Cyrus W. Rice
ATTORNEY.

Nov. 9, 1926. 1,606,232
O. G. JENTSCH
VALVE STRUCTURE
Filed June 3, 1925  3 Sheets-Sheet 2
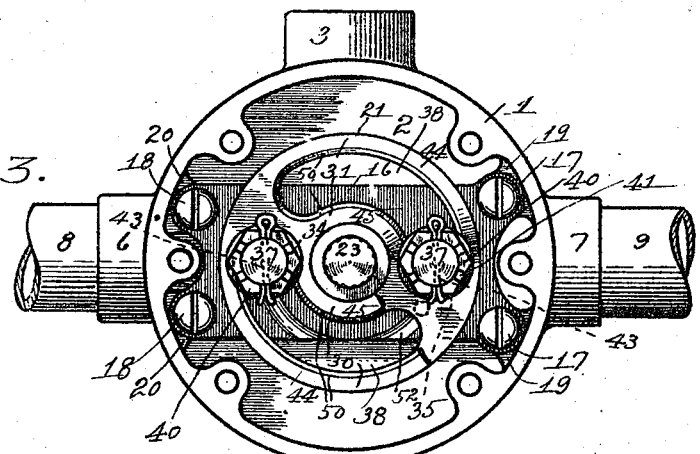
INVENTOR.
Otto G. Jentsch
BY
Cyrus W. Rice
ATTORNEY.

Nov. 9, 1926.

O. G. JENTSCH 1,606,232

VALVE STRUCTURE

Filed June 5, 1925

INVENTOR.
Otto G. Jentsch
BY
Cyrus W. Rice
ATTORNEY.

Witness:

Patented Nov. 9, 1926.

1,606,232

UNITED STATES PATENT OFFICE.

OTTO G. JENTSCH, OF GRAND RAPIDS, MICHIGAN, ASSIGNOR TO WOLVERINE BRASS WORKS, OF GRAND RAPIDS, MICHIGAN, A CORPORATION OF MICHIGAN.

VALVE STRUCTURE.

Application filed June 5, 1925. Serial No. 35,071.

The present invention relates to valve structures; and its object is, generally, to provide such a structure improved in various respects and particularly adapted for use in bath apparatus wherein hot and cold water in desired variable proportions are used.

This general object and any other and more specific objects hereinafter appearing are attained by, and the invention finds preferable embodiment in, the structure hereinafter particularly described in the body of this specification and illustrated by the accompanying drawings, in which:—

Figure 3 is a side view of the main portion of said structure, the closing caps and operating handle being removed;

Figure 4 is a side view of the same, the valves and their carrying and operating means being removed;

Figure 5 is a view of the valves and their carrying and operating means;

Figure 1:
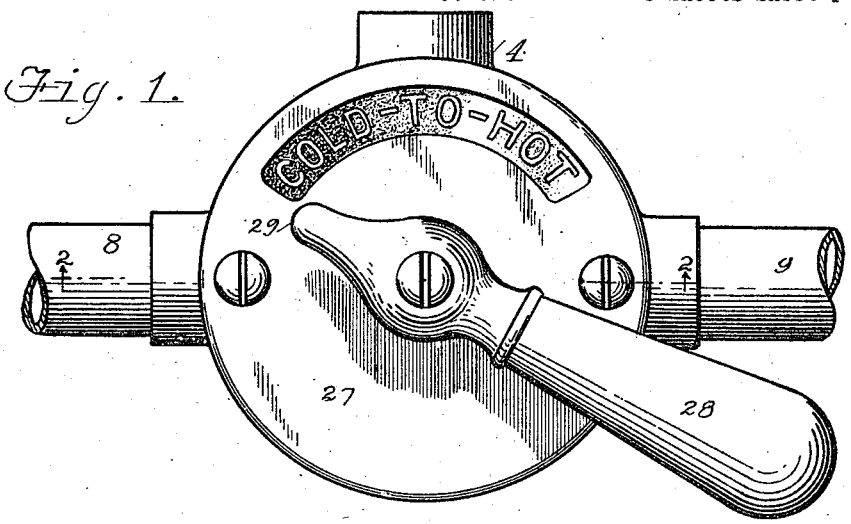
Figure 1 is a face view of a valve structure.
Figure 2:
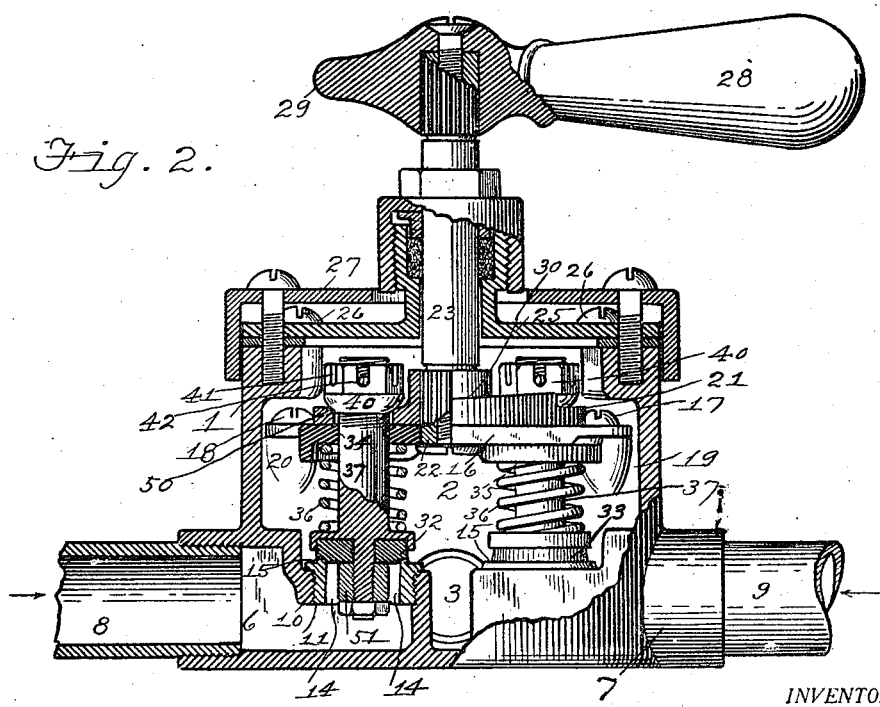
Figure 2 is a transverse sectional view of the same taken on line 2—2 of Figure 1, certain fragmentary parts thereof however being shown not sectioned.
Figure 6:
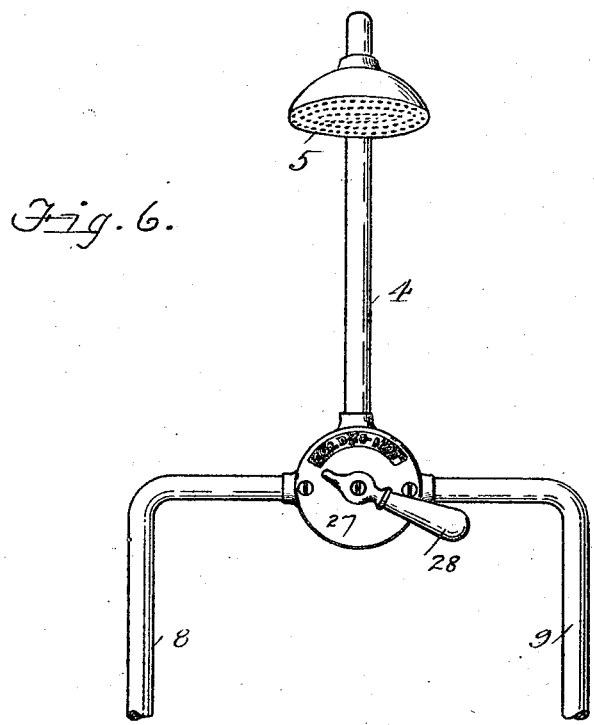
Figure 6 is a face view of said structure with its supply pipes and discharge pipe.

In the accompanying drawings, a valve structure having supply pipes and a discharge pipe fitted with a spraying nozzle is shown. This structure comprises a body portion, a casting 1, containing a "mixing" chamber 2 having an outlet 3 to its discharge pipe 4 terminating in the spraying nozzle 5, and inlets 6, 7 from the hot water supply pipe 8 and the cold water supply pipe 9 respectively. These inlets are preferably threaded at 10 to receive threaded valve seat members 11 having openings 12 therethrough comprising a central portion 13 and fluid passages 14 radiating therefrom, these valve seat members having valve seats 15. A member, the plate 16, is detachably and removably mounted on the body 1 inside the chamber 2 in such manner that it and the body 1 may be assembled in only one interrelative position, as by the screws 17 and 18 passing therethrough and threaded in the inwardly-extending lugs 19, 20 respectively of the body 1, the openings through said member 16 for the screws 17, being spaced further apart than are the openings for the screws 18.

An element, the plate 21, is rotatably mounted on the member 16 at 22 and carries the spindle 23 extending through the cover 25 of chamber 2 (which cover is secured removably to the body 1 by screws 26), the spindle then extending through the detachably mounted outer cap 27 of the structure and being furnished with an operating handle 28 having a pointer 29 directed by the turning of said handle to suitable indicating marks as the words "Cold—to—Hot" displayed on the outer surface of said cap.

This element or plate 21 has cams, indicated generally 30, 31, extending outwardly and operating by the turning of the element 21 by its handle to open, or permit the closing of, the puppet valves 32, 33 slidably carried at 34, 35 by the member 16 and spring-pressed at 36 into seating position on the valve seats 15 respectively. The stems 37 of these valves extend through arcuate openings 38 in the element 21 and are threaded at 39 to receive nuts 40, which preferably have a plurality of axially-spaced openings 41, so that a cotter pin 42 may be thrust through any of said openings and into the aperture 43 extending transversely of the valve stem to secure the nut against turning thereon. These nuts may be tightened or loosened to adjust the position of the valves 32, 33 relatively to their seats 15 respectively.

Each of the cams 30 and 31 comprises a pair of arcuately-disposed parallel cam surfaces 44 and 45, disposed at the opposite sides of the respective openings 38. Inasmuch as the valves' stems 37 pass through these openings 38 and their nuts bear at their opposite sides on the members 44, 45 of these pairs respectively, it will be seen that the lifting or opening operation of each pair 44, 45 on the valves is such that the valves' stems have no tendency to bind in their sliding movement in the openings 34, 35 in which they bear. In order to minimize the friction of these nuts on the cams, said pairs 44, 45 have inwardly-inclined adjacent edges 50 on which the nuts bear; or equivalent thereto, the nuts themselves or both the nuts and said pairs of cam members may have such inclined bearing edges as shown. The inner ends of the valve stems are threaded as shown to receive detachable extension members 51 bearing in the central portions 13 of the openings 12.

The member 16 carrying the valves has an arcuately-disposed groove 52 with end stops 53, and the rotatable element 21 has a lug 54 engaging in said groove, so that said member and element cannot be assembled in any interrelative position other than that in which the cam 30 will operate the hot water-controlling valve 32 and the cam 31 will operate the cold water-controlling valve 33.

Figure 7:
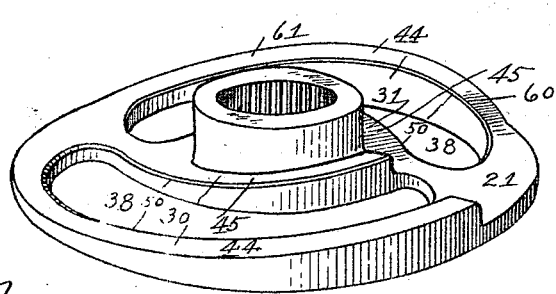
Figure 7 is a view in perspective of a rotatable element having valve-operating cams.

The cam 30 for operating the hot water-controlling valve 32 rises inclinedly and the cam 31 for operating the cold water-controlling valve 33 rises at 60 and then falls at 61 inclinedly as seen in Figure 7, so that the cold water-controlling valve may be increasingly opened and then closed during the continued opening movement of the hot-water-controlling valve.

The invention being intended to be pointed out in the claims, is not to be limited to or by details of construction of the particular embodiment thereof illustrated by the drawings or hereinbefore described.

I claim:

1. In a structure of the character described: a body containing a chamber having an outlet and inlets provided with valve seats; a member carrying puppet valves seating on said seats; means rotatable on said member and engaging the valves for operating the same; the body and said member having registering means whereby they may be detachably connected in one interrelative position only.

2. In a structure of the character described: a rotatable element having an opening and a pair of arcuately-disposed cams at the opening's opposite sides and having their faces extending transversely to said element's axis; a valve having a stem extending through the opening and bearing on the cams in said element's valve-operating rotative movement.

3. In a structure of the character described: a rotatable element having an opening and a pair of arcuately-disposed cams at the opening's opposite sides with inwardly-inclined adjacent edges; a valve having a stem extending through the opening and bearing on said edges in said element's valve-operating rotative movement.

4. In a structure of the character described: a rotatable element having an opening and a pair of arcuately-disposed cams at the opening's opposite sides; a valve spring-pressed to seating position and having a threaded stem extending through the opening provided with a nut bearing on the cams in said element's valve-operating rotative movement.

5. In a structure of the character described: a rotatable element having an opening and a pair of arcuately-disposed cams at the opening's opposite sides; a valve spring-pressed to seating position and having a threaded stem extending through the opening provided with a nut bearing on the cams in said element's valve-operating rotative movement, the valve stem having a transverse aperture and the nut having a plurality of axially-spaced openings, the socket and any of said spaced openings registering therewith being adapted to receive a cotter pin.

6. In a structure of the character described: a body containing a chamber having an outlet and inlets provided with valve seats; a member carrying puppet valves seating on said seats and having an arcuately-disposed groove with end-stops; means detachably mounted rotatably on said member for operating the valves and having a lug engaging in the groove.

In testimony whereof I have hereunto set my hand at Grand Rapids, Michigan, this 27th day of May, 1925.

OTTO G. JENTSCH.